United States Patent
Jia et al.

(10) Patent No.: US 11,409,118 B2
(45) Date of Patent: Aug. 9, 2022

(54) DEVICE AND METHOD FOR GENERATING A 3D LIGHT FIELD

(71) Applicants: Huawei Technologies Co., Ltd., Shenzhen (CN); CAMBRIDGE ENTERPRISE LIMITED, Cambridgeshire (GB)

(72) Inventors: Jia Jia, Cambridgeshire (GB); Jhensi Chen, Cambridgeshire (GB); Daping Chu, Cambridgeshire (GB); Qing Zhang, Shenzhen (CN); Tao Lin, Shenzhen (CN)

(73) Assignees: Huawei Technologies Co., Ltd., Shenzhen (CN); Cambridge Enterprise Limited, Cambridgeshire (GB)

( * ) Notice: Subject to any disclaimer, the term of this patent is extended or adjusted under 35 U.S.C. 154(b) by 284 days.

(21) Appl. No.: 16/664,409

(22) Filed: Oct. 25, 2019

(65) Prior Publication Data
US 2020/0057312 A1     Feb. 20, 2020

Related U.S. Application Data

(63) Continuation of application No. PCT/EP2017/059956, filed on Apr. 26, 2017.

(51) Int. Cl.
*G02B 27/28* (2006.01)
*G02B 30/25* (2020.01)
*G02B 27/01* (2006.01)
*G02F 1/1335* (2006.01)

(52) U.S. Cl.
CPC ....... *G02B 27/283* (2013.01); *G02B 27/0172* (2013.01); *G02B 30/25* (2020.01); *G02F 1/133528* (2013.01); *G02F 1/13355* (2021.01)

(58) Field of Classification Search
CPC .......... G02F 1/13355; G02F 1/133528; G02B 27/283; G02B 27/0172; G02B 30/25
USPC ........................................................ 359/489
See application file for complete search history.

(56) References Cited

U.S. PATENT DOCUMENTS

| | | | |
|---|---|---|---|
| 2009/0116732 A1 | 5/2009 | Zhou et al. | |
| 2014/0267941 A1* | 9/2014 | Ellsworth | G02B 27/0172 349/5 |
| 2016/0048018 A1* | 2/2016 | De Matos Pereira Vieira | G02B 27/0081 348/53 |

FOREIGN PATENT DOCUMENTS

| | | |
|---|---|---|
| CN | 102685533 A | 9/2012 |
| CN | 105103032 A | 11/2015 |
| WO | 9908145 A1 | 2/1999 |
| WO | 03079272 A1 | 9/2003 |
| WO | 2007028125 A2 | 3/2007 |
| WO | 2015117043 A1 | 8/2015 |

* cited by examiner

*Primary Examiner* — Nathanael R Briggs
*Assistant Examiner* — William D Peterson
(74) *Attorney, Agent, or Firm* — Leydig, Voit & Mayer, Ltd.

(57) ABSTRACT

The present disclosure provides a device for generating a 3D light field. The device comprises a first lens having a fixed focal length, and an imaging element arranged to send light into the first lens. The imaging element is configured to send the light from different positions within a defined distance on the optical axis of the first lens, in order to produce different depth layers of the 3D light field within a frame duration.

18 Claims, 7 Drawing Sheets

DEVICE AND METHOD FOR GENERATING A 3D LIGHT FIELD

CROSS-REFERENCE TO RELATED APPLICATIONS

This application is a continuation of International Application No. PCT/EP2017/059956, filed on Apr. 26, 2017, the disclosure of which is hereby incorporated by reference in its entirety.

TECHNICAL FIELD

The present disclosure relates to a device and a method for generating a 3-dimensional (3D) light field. In particular, the device and method can be used to produce different depth layers of the 3D light field within a frame duration. The device of the present disclosure can be included in, or can be, a Head Mount Display (HMD) device.

BACKGROUND

Figure 6:
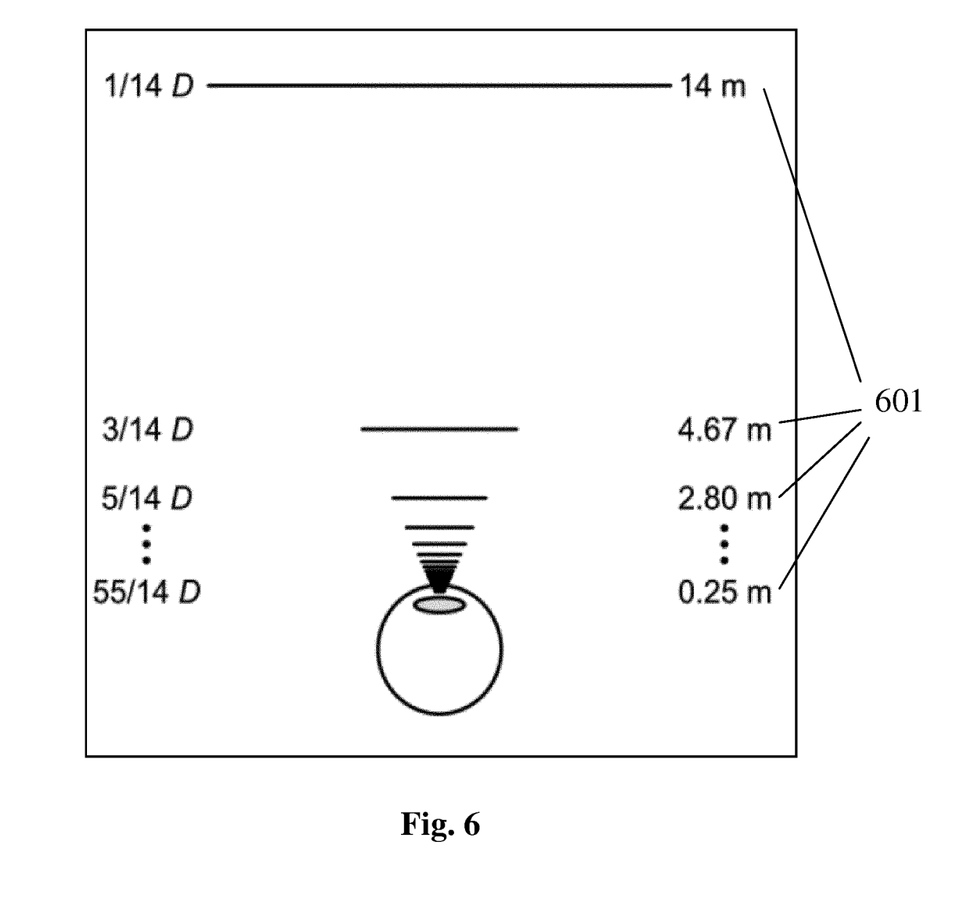
FIG. 6 shows a 3D light field with different depth layers.
Figure 7:
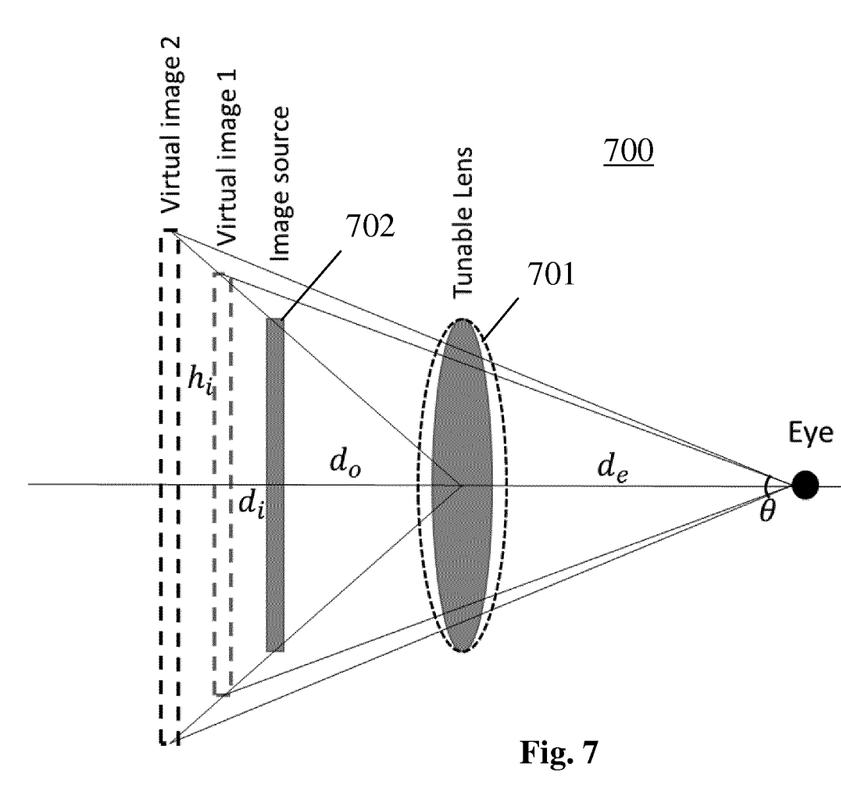
FIG. 7 shows a conventional device.

A conventional device for generating a 3D light field is shown in FIG. 7. The device 700 includes a tunable lens 701, which is arranged in front of a fixed image provided by an image source 702. The focal length of the tunable lens 701 is changed synchronously with the content of the image displayed on the image source 702. Thereby, different virtual images (e.g. virtual images 1 and 2 in FIG. 7) can be seen by a user of the device, wherein these virtual images are perceived as different focal planes. As shown in FIG. 6, each virtual image accordingly represents a different depth layer 601 of the generated 3D light field.

A major disadvantage of the conventional device for generating the 3D light field is that a Field of View (FOV) varies for different focal planes. This leads to different angular resolutions of different depth layers of the 3D light field.

SUMMARY

In view of the above-mentioned disadvantage, the present disclosure describes how to improve the conventional device for generating a 3D light field. The present disclosure particularly describes to generate a 3D light field, wherein the FOV is constant for each depth layer (focal plane) of the 3D light field.

An object is achieved by the solution provided in the enclosed independent claims. Advantageous implementations of the present disclosure are further defined in the dependent claims.

The main idea of the present disclosure is replacing the tunable lens of the conventional device with a fixed focal length lens, and at the same time replacing the fixed image with a movable image. Notably, this movable image can be either a physical image or a virtual image, and can accordingly be generated by different imaging elements.

A first aspect of the present disclosure provides a device for generating a 3D light field, comprising a first lens having a fixed focal length, and an imaging element arranged to send light into the first lens, wherein the imaging element is configured to send the light from different positions within a defined distance on the optical axis of the first lens, in order to produce different depth layers of the 3D light field within a frame duration.

With the device of the first aspect, a 3D light field including different depth layers can be generated, wherein a FOV is the same for each depth layer. In particular, the device controls a position from which the imaging element sends the light into the first lens, in order to produce the different depth layers. Each of the different positions on the optical axis corresponds preferably to one of the different depth layers. The different positions may be assumed by a movement of the imaging element to these positions or by an enabling/disabling of components of the imaging element at these positions, as will be described in more detail below. A frequency of the controlled movement or the enabling/disabling is referred to as a scanning frequency. The defined distance along the optical axis, which, for example, represents the travel range of the imaging element in case it is moved, determines the depth range of the 3D light field. The depth range of the 3D light field is the distance between the nearest and the furthest depth layer with respect to the eyes of a user. A device implementing a large defined distance and a high scanning frequency can produce a large depth range with video frame rates.

In an implementation form of the first aspect, the imaging element is a liquid crystal arrangement including a plurality of liquid crystal layers arranged at the different positions, and each of the liquid crystal layers is configured to be enabled or disabled according to a predefined sequence.

An advantage of this implementation form is that the enabling/disabling of the components (liquid crystal layers) of the imaging element can be carried out very fast, i.e. with frequency above 30 Hz, and even above 100 Hz. Thus, the positions, from which the imaging element sends light into the first lens, can be changed rapidly and a high scanning frequency is achieved.

In a further implementation form of the first aspect, the imaging element is configured to move forward or backward over the defined distance along the optical axis of the first lens.

This implementation form can be realized with relatively simple and cheap components, like an image source or mirror as explained below.

In particular, the imaging element is moved along the optical axis over the defined distance, in order to send the light from the different positions within the defined distance.

In a further implementation form of the first aspect, the device further comprises a translation stage, on which the imaging element is mounted and which is configured to move the imaging element forward and backward over the defined distance along the optical axis of the first lens.

A translation stage, also referred to as 'z scanner' is easy to control with high precision. Furthermore, translation stages configured to apply high movement frequencies of at least 30 Hz, and up to 100 Hz, are commercially available.

In a further implementation form of the first aspect, the imaging element is an image source, particularly a display device.

The image source generates a physical image, which is moved forward and backward along the first lens axis. This implementation form is the least complex from an optical point of view.

In a further implementation form of the first aspect, the imaging element is a mirror configured to reflect light from an image source into the first lens.

By moving the mirror, an intermediate image reflected by the mirror towards the first lens is moved forward and backward along the first lens axis. The advantage of this implementation form is that it is not necessary to move, with high frequencies, an image source. For instance, a liquid crystal display (LCD) or similar image source, may be inconvenient to move.

In a further implementation form of the first aspect, the device further comprises a second lens configured to reform an image from the image source as an intermediate image between the mirror and the first lens, wherein a distance between the intermediate image and the first lens is preferably less than the focal length of the first lens.

The intermediate image is an intermediate image, which may be moved forward and backward along the optical axis of the first lens by respectively moving the mirror. Due to the intermediate image, a user will perceive virtual images of the intermediate image as different depth layers of the intermediate image, when using the device.

In a further implementation form of the first aspect, the device further comprises, a polarizer arranged between the image source and the second lens to polarize the light from the image source, a polarizing beam splitter, PBS, configured to reflect the polarized light from the image source onto the mirror.

In a further implementation form of the first aspect, the device further comprising a quarter waveplate arranged between the PBS and the mirror to allow light reflected from the mirror to pass through the PBS into the first lens.

In a further implementation form of the first aspect, the device further comprises a light guide arranged to redirect the light sent into and transmitted through the first lens so as to overlap said sent and transmitted light ambient light.

In this way, the device of embodiments of the present disclosure can be used as augmented reality device, and easily as HMD device.

In a further implementation form of the first aspect, the imaging element is configured to move over the defined distance step by step with a step frequency that is equal to a refresh rate of the image source and with step lengths that correspond to a distance between two adjacent depth layers.

In this implementation form, the imaging element is moved by a sequential action of stepping, i.e. moving, stopping, moving, stopping and so on. The refresh rate of the image source defines the display time for each depth layer. That is, the image source is refreshed after each generated depth layer image. The step frequency must be high enough to support all the depth layers during a frame duration.

In a further implementation form of the first aspect the imaging element is configured to move forward and backward over the defined distance continually with a frequency that is equal to a frame rate of the image source.

In this case, the imaging element moves forward and backward continuously without stopping. A trigger signal can be generated, either in the time domain or by the position of the imaging element, in order to control the image source to show a depth layer image according to the position of the imaging element. The frame rate corresponds to the refresh rate of displaying, by the image source, a whole 3D image (including all depth layer images).

The defined distance (travel range) is the maximum distance of movement of the imaging element. Thereby, the user perceives a depth range, over which the generated depth layers can be accurately focused on the retina of the user's eye. The depth range is the travel range multiplied by the square of a magnification factor of the optical system of the device. This magnification factor depends on the first lens.

In a further implementation form of the first aspect, the device further comprises an eye piece for displaying the generated 3D light field, wherein a distance between the first lens and the eyepiece is equal to the focal length of the first lens.

In this way, the common FOV for each depth layer is set accurately.

In a further implementation form of the first aspect, the device is a head mount display, HMD, device.

A second aspect of the present disclosure provides a method for generating a 3D light field, comprising sending light from an imaging element into a first lens having a fixed focal length, wherein the imaging element sends the light from different positions within a defined distance on the optical axis of the first lens, in order to produce different depth layers of the 3D light field within a frame duration.

In an implementation form of the second aspect, the method comprises moving the imaging element forward and backward over the defined distance along the optical axis of the first lens, in order to send the light from the different positions.

In an implementation form of the second aspect as such, the method further comprises reflecting light from an image source into the first lens by a mirror, wherein an image from the image source is reformed as an intermediate image between the mirror and the first lens, particularly in front of the first lens, and moving the mirror forward and backward over the defined distance along the optical axis of the first lens, in order to move the intermediate image.

In a further implementation form of the second aspect, the method further comprises reforming, with a second lens, an image from the image source as an intermediate image between the mirror and the first lens, wherein a distance between the intermediate image and the first lens is preferably less than the focal length of the first lens.

In a further implementation form of the second aspect, the method further comprises polarizing, with a polarizer between the image source and the second lens, the light from the image source, and reflecting, with a PBS, the polarized light from the image source onto the mirror.

In a further implementation form of the second aspect, the method further comprises arranging a quarter waveplate between the PBS and the mirror to allow light reflected from the mirror to pass through the PBS into the first lens.

In a further implementation from of the second aspect as such, the imaging element is an image source, particularly a display device.

In a further implementation from of the second aspect, the method further comprises redirecting, with a light guide, the light sent into and transmitted through the first lens so as to overlap said sent and transmitted light ambient light.

In a further implementation form of the second aspect, the method comprises moving the imaging element over the defined distance step by step with a step frequency that is equal to a refresh rate of the image source and with step lengths that correspond to a distance between two adjacent depth layers.

In a further implementation form of the second aspect, the method comprises moving the imaging element forward and backward over the defined distance continually with a frequency that is equal to a frame rate of the image source.

In a further implementation form of the second aspect, the method further comprises using an eye piece for displaying the generated 3D light field, wherein a distance between the first lens and the eyepiece is equal to the focal length of the first lens.

The method of the second aspect and its implementation forms achieve all advantages described above for the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTION OF THE EMBODIMENTS

Figure 1:
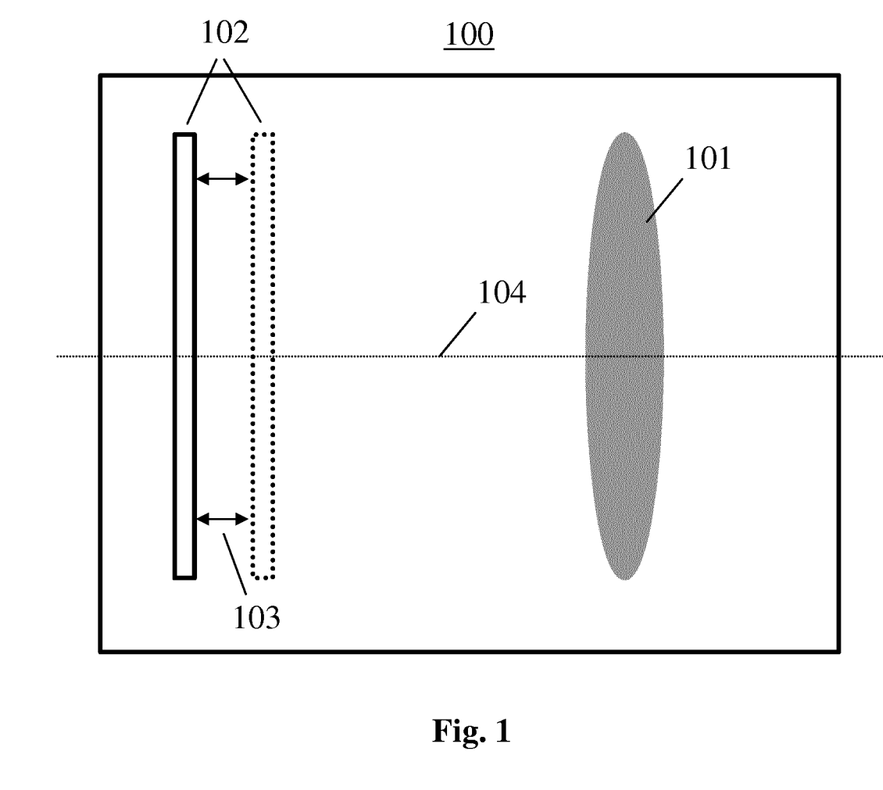
FIG. 1 shows a device according to an embodiment of the present disclosure.

FIG. 1 shows a device 100 according to an embodiment of the present disclosure. The device 100 is configured to generate a 3D light field with different depth layers 601 as, for instance, shown in FIG. 6. The different depth layers 601 are different focal planes perceived by a user, and thus the impression of a 3D image is conveyed.

The device 100 specifically comprises a first lens 101 with a fixed focal length—contrary to the variable focal length of the tunable lens 701 of the conventional device 700 shown in FIG. 7. Further, the device 100 comprises an imaging element 102 arranged to send light into the first lens 101. Contrary to the fixed image source 702 of the conventional device 700 shown in FIG. 7, the imaging element 102 of device 100 is configured to send the light from different positions within a defined distance 103 on the optical axis 104 of the first lens 101, in order to produce different depth layers (FIG. 6, 601) of the 3D light field within a frame duration.

For instance, a liquid crystal arrangement may be used as the imaging element. The liquid crystal arrangement specifically includes a plurality of liquid crystal layers, which are arranged at the different positions on the optical axis of the first lens 101 within the defined distance 103. Each of the liquid crystal layers is configured to be enabled or disabled according to a predefined sequence. If a liquid crystal layer is enabled, it is configured to reflect light from an image source into the first lens. If a liquid crystal layer is disabled, it does not reflect light. Preferably, an enabled liquid crystal layer orients its liquid crystals so as to reflect the light form the image source. Preferably only one liquid crystal layer is enabled at the same time. Specifically, each liquid crystal layer may be controlled to reflect an image from the image source at a predefined time and at its defined position within the defined distance on the optical axis 104 of the first lens 101.

Alternatively, the imaging element 102 may be movable, i.e. it may be configure to move forward or backward over the defined distance 103 along the optical axis of the first lens 101, in order to send the light into the first lens 101 from the different positions. That is, the imaging element 102 is move from one position within the defined distance to the other, and to reflect light from each of these positions. The movement of the imaging element 102 is specifically configured to produce the different depth layers 601 of the 3D light field within the frame duration. The movement of the imaging element 102 may preferably be effected by a translation stage, on which the imaging element 102 is mounted, and which is configured to move forward and backward along the optical axis 104 of the first lens 101.

Figure 2:
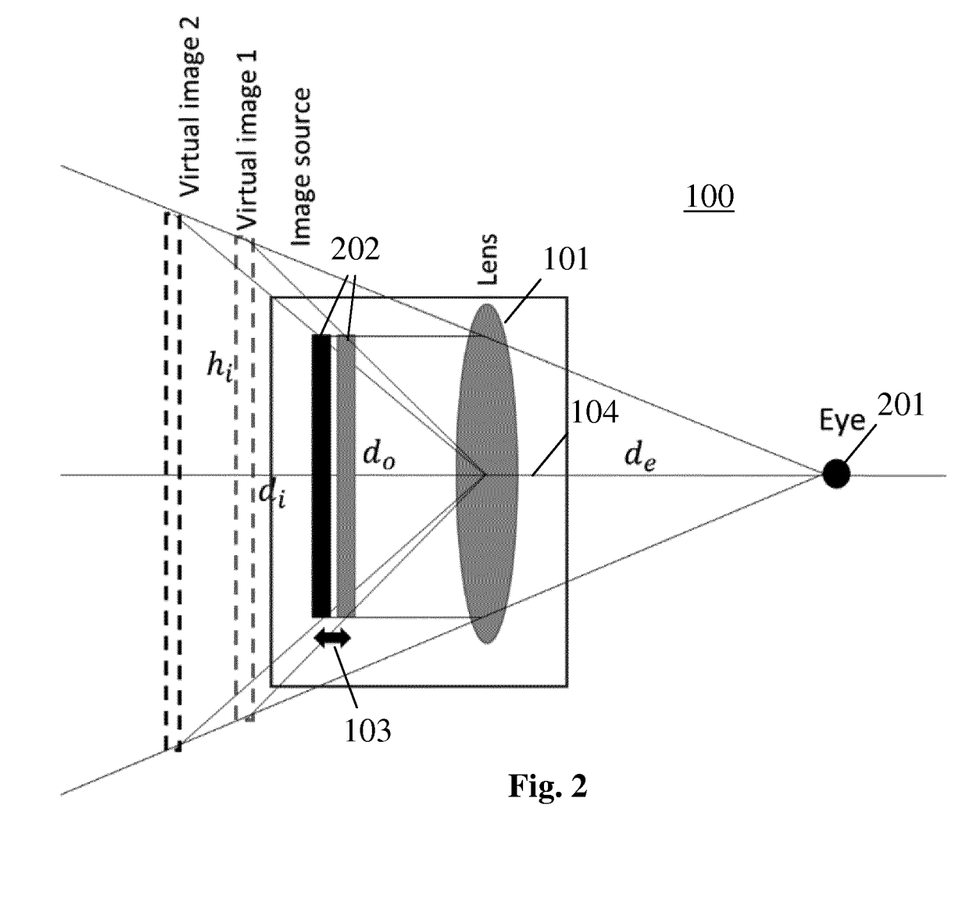
FIG. 2 shows a device according to an embodiment of the present disclosure.

FIG. 2 shows a device 100 according to an embodiment of the present disclosure, which builds on the embodiment of the device 100 shown in FIG. 1. In the device 100 of FIG. 2, the imaging element 102 is specifically an image source 202, particularly is a display device such as a LCD. The image source 202 is configured to move in front of the first lens 101 with the fixed focal length, in order to generate virtual images (virtual image 1 corresponding to the position of the image source closer to the lens 101 and virtual image 2 corresponding to the position of the image source 202 further from the lens 101 in FIG. 2) seen by a user of the device through the first lens 101. The user perceives these virtual images as different focal planes, i.e. as the different depth layers 601 that compose the 3D light field.

In order to move the image source 202 fast enough, i.e. with a frequency of 30 Hz or even more, preferably even up to a frequency of 100 Hz, a linear translation stage may preferably be employed. The image source 202 is in this case preferably mounted on the translation stage, and is accordingly dragged by the stage forward and backward with a high enough frequency to produce 3D videos.

The travel range and scanning frequency of the image source 202 are controlled by the device 100. Thus, the image source 202 can be moved rapidly and precisely, in order to produce the different depth layers 600 of the 3D light field.

The FOV θ, for instance indicated in the FIGS. 2 and 7, satisfies the following equation:

$$\tan\frac{\theta}{2} = \frac{h_i}{2(d_i + d_e)} = \frac{2h_0}{d_0 + d_e - \frac{d_0 d_e}{f}}$$

In the above equation (as shown in FIGS. 2 and 7), $h_o$ indicates the height of the image source, $h_i$ indicates the height of the virtual image, $d_i$ indicates the distance of the virtual image distance from the image source 202, $d_o$ indicates the distance between the image source 202 and the first lens 101, f is the focal length, and $d_e$ is the eye relief that is preferably set to f.

If now the focal length f is changed, in order to produce different perceived depth layers 601, like in the conventional device 700, the FOV θ also changes—as indicated in FIG. 7. However, in the device 100, the first lens 101 has a fixed focal length f and rather the distance $d_o$ is changed by moving the image source 202, in order to produce different perceived depth layers 601. The FOV θ is in this case independent of the distance $d_o$, and satisfies the following equation:

$$\tan\frac{\theta}{2} = \frac{2h_0}{d_e}$$

Accordingly—contrary to the conventional device 700—the device 100 of FIG. 2 realizes different depth layers 601 having the same FOV.

Figure 3:
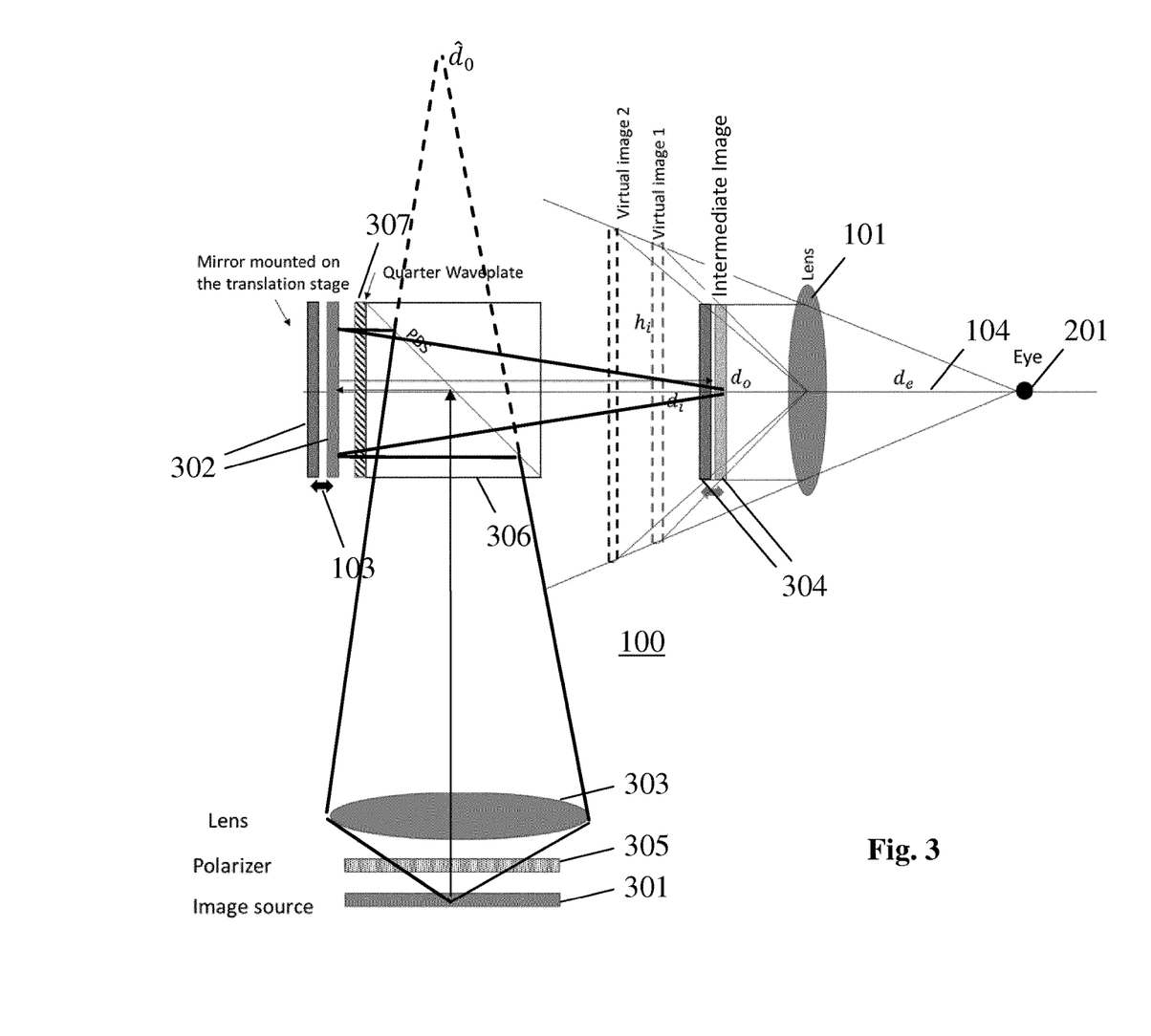
FIG. 3 shows a device according to an embodiment of the present disclosure.

FIG. 3 shows another embodiment of the present disclosure, which builds on the embodiment of the device 100 shown in FIG. 1. In the embodiment of FIG. 3, the imaging element 102 is a mirror 302, which is configured to reflect light from an image source 301 into the first lens 101.

A second lens 303 is preferably used to generate an intermediate image reflected by the mirror 302, namely by reforming an image from the image source 301 as the intermediate image 304 between the mirror 302 and the first lens 101, particularly in front of the first lens 101. The first lens 101 is placed in front of the intermediate image 304, which results in a virtual image (virtual images 1 and 2 in FIG. 3) being perceived by a user as a depth layer 601 of the 3D light field. When the intermediate image 304 moves, the virtual image seen by the eyes of the user will also move, thereby generating different focal planes (indicated by virtual images 1 and 2, respectively) that will be perceived by the user as 3D light field.

In the device 100 of FIG. 3, the mirror 302 is moved, in order to move the intermediate image 304, and thus to generate the different depth layers 601 of the 3D light field. To this end, the mirror 302 is preferably mounted on a translation stage (as the image source 202 in FIG. 2). The image source 301, however, is static. Moving the mirror 302, but not moving the image source 301, can be advantageous, because there may be cables connected to the image source 202 of FIG. 2, making its movement inconvenient. Also, the image source 202 may be too bulky to move precisely with a high frequency.

In the device 100 of FIG. 3, light from the image source 301 at first passes through a preferably installed polarizer 305, in order to select the light only with desired polarization direction. After the polarizer 305, the light then passes through the second lens 303, in order to focus the image provided by the image source 301 to the desired position, i.e. to the position indicated as the intermediate image 304 in FIG. 3. Specifically, the second lens 301 is configured to focus the image at a distance $\hat{d}_o$ (dashed lines in FIG. 3), which is equal to the light path length between the second lens 303 and the plane of the intermediate image.

After passing through the second lens 302, the light is reflected by preferably a PBS 306 to the movable mirror 302 (solid lines), which may be mounted on the translation stage, so that when the mirror 302 moves forward and backward along the optical axis 104 of the first lens 101, the intermediate image 304 moves correspondingly.

Accordingly—contrary to the conventional device 700—the device 100 of FIG. 3 realizes different depth layers 601 having the same FOV. The difference between the devices 100 of FIGS. 2 and 3 is that in the device 100 of FIG. 2 a physical image provided by the image source 202 is moved, while in FIG. 3 a virtual image reformed from the image provided by the image source 301 is moved.

Figure 4:
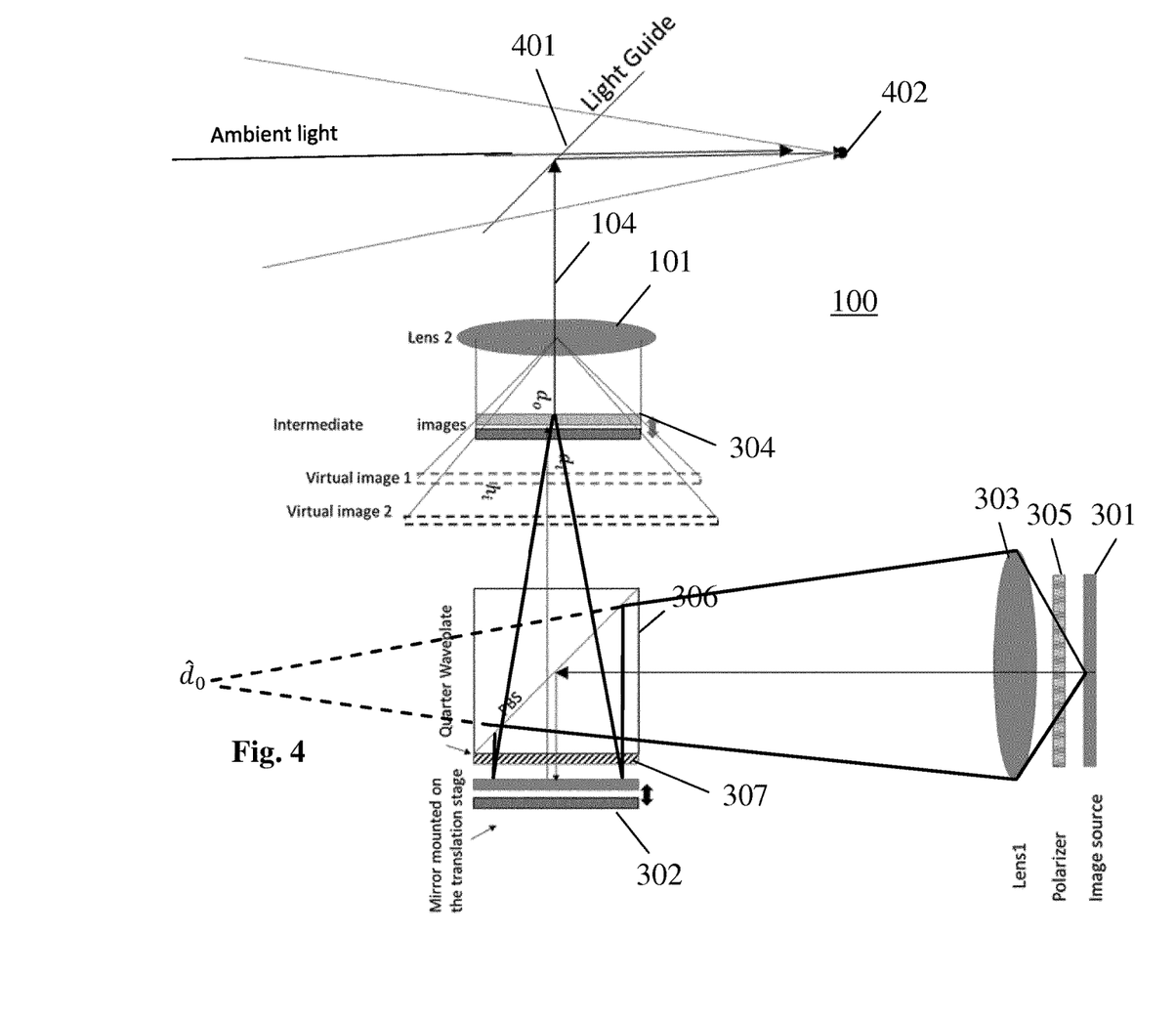
FIG. 4 shows a device according to an embodiment of the present disclosure.

FIG. 4 shows a device 100 according to another embodiment of the present disclosure, which builds on the device 100 embodiment shown in FIG. 3. However, this is only an exemplary illustration. That is, the features that are added in the device 100 of FIG. 4 compared to the device 100 of FIG. 3, can also be added to the devices 100 of FIG. 1 and FIG. 2, respectively.

In particular, a light guide 401 is added to the device 100. The light guide 401 is used to make the device 100 an augmented reality device. The light guide 401 is specifically used to deflect the light field coming from first lens 101 into the eyes of the user, while the physical world light can also be seen. That is, the light guide 401 is arranged to redirect the light sent into and transmitted through the first lens 101, so as to overlap said sent and transmitted light with ambient light. The simplest implementation of the light guide 401 comprises, or is, a PBS. However, in order to make the size of the light guide 401 smaller, also a reflective diffraction grating can be used.

Figure 5:
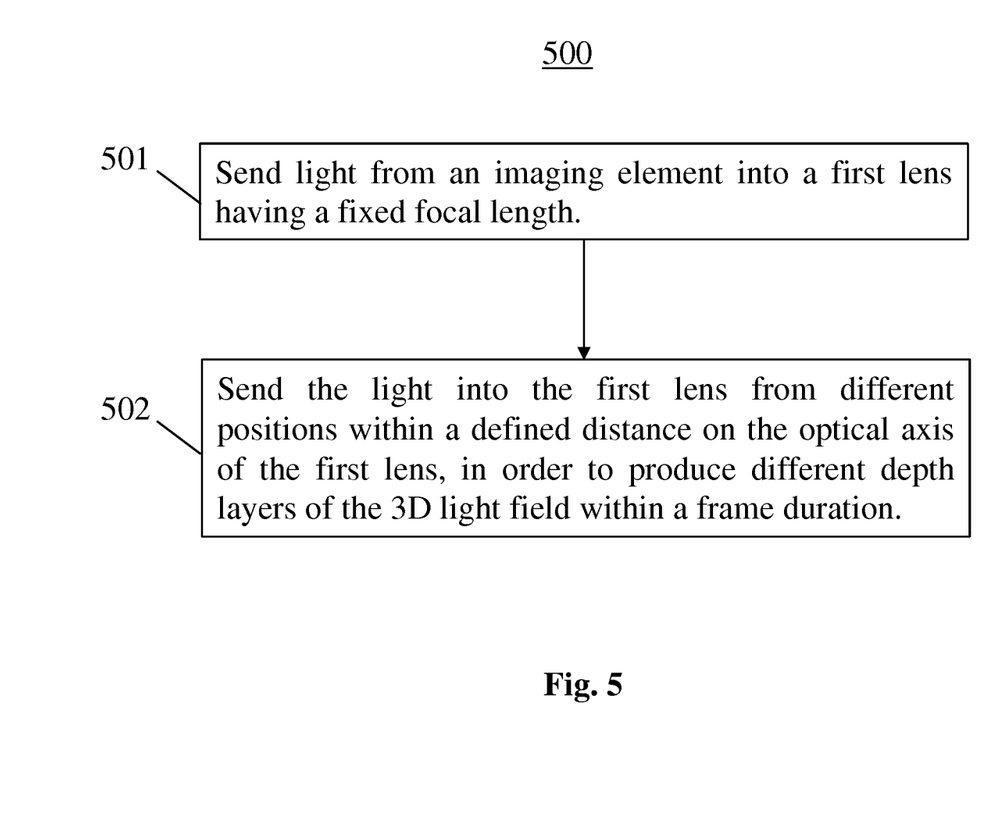
FIG. 5 shows a method according to an embodiment of the present disclosure.

FIG. 5 shows a method 500 according to an embodiment of the present disclosure. Preferably, the method 500 is implemented by device 100 shown in one of the FIGS. 1-4. The method 500 includes a step 501 of sending light from an imaging element 102 into a first lens 101 having a fixed focal length. The imaging element 102 may be the liquid crystal arrangement, the image source 202 or the mirror 302. The method 500 further includes a step 502 of sending the light into the first lens 101 from different positions within a defined distance 103 on the optical axis of the first lens 101, in order to produce different depth layers 601 of a 3D light field within a frame duration. To this end, the imaging element 102 may be moved forward and backward over the defined distance 103, in order to send the light from the different positions. That is, the position of the imaging element 102 as a whole changes. Alternatively, different components of the imaging element 102 arranged at the different positions over the defined distance 103, for instance liquid crystal layers of the liquid crystal arrangement, may be enabled (activated) or disabled (deactivated) according to some predefined sequence, in order to send the light from the different positions. That is, the position of the imaging element 102 as a whole stays the same, only the position of the currently activated component changes.

In summary, embodiments of the disclosure describe an imaging element 102, 202 or 302 that is able to send light from different positions, which is combined with a first lens 101 with a fixed focal length. Different depth layers 601 of the 3D light field are produced by the sending of the light from the different positions by the imaging element 102, 202 or 302. For instance, by moving an image source 202 as in FIG. 2 to the different positions, a physical image is moved in front of the first lens 102. By moving a mirror 302 as in FIG. 3 to the different positions, a virtual (intermediate) image 304 is moved in front of the first lens 101. By activating and deactivating liquid crystal layers of a liquid crystal arrangement, each liquid crystal layer being arranged at a different one of the positions, the same effect as with the movable mirror 302 is achieved. In all cases, this leads to virtual images perceived by the user through the first lens 101 as the different depth layers 601 of the 3D light field.

In both of the movement cases, the imaging element 102, 202 or 302 may be mounted on a rapidly moving translation stage, which preferably moves only linearly, i.e. a linear translation stage. The fastest commercially available stages of this sort, can produce a scanning frequency, i.e. a movement frequency of the imaging element 102, 202 or 302 of up to 100 Hz. In the case of a liquid crystal arrangement, even higher scanning frequencies by switching the currently enabled liquid crystal layer can be achieved.

In both movement cases, the imaging element 102, 202 or 302 may be moved step by step over the defined distance 103. The movement in this case should have a step frequency that is equal to a refresh rate of the image source 202 or 301, and should be carried out with step lengths that correspond to a distance between two adjacent depth layers 601 of the 3D light field produced. Alternatively, the imaging element 102, 202 or 302 may be moved continually over the defined distance 103. The movement in this case should have a (forward/backward) frequency that is equal to a frame rate of the image source 202 or 301.

The present disclosure has been described in conjunction with various embodiments as examples as well as implementations. However, other variations can be understood and effected by those persons skilled in the art and practicing the claimed embodiments, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for generating a 3-dimensional, 3D, light field, comprising:
a first lens having a fixed focal length, and
an imaging element arranged to send light into the first lens,
wherein the imaging element is configured to move to different positions within a defined distance on an optical axis of the first lens, and to send the light from the different positions in order to produce different depth layers of the 3D light field within a frame duration.

2. The device according to claim 1, wherein:
the imaging element is a liquid crystal arrangement including a plurality of liquid crystal layers arranged at the different positions, and
each of the liquid crystal layers is configured to be enabled or disabled according to a predefined sequence.

3. The device according to claim 1, wherein:
the imaging element is configured to move forward or backward over the defined distance along the optical axis of the first lens.

4. The device according to claim 3, further comprising:
a translation stage, on which the imaging element is mounted and which is configured to move the imaging element forward and backward over the defined distance along the optical axis of the first lens.

5. The device according to claim 3, wherein:
the imaging element is an image source.

6. The device according to claim 3, wherein:
the imaging element is a mirror configured to reflect light from an image source into the first lens.

7. The device according to claim 6, further comprising:
a second lens configured to reform an image from the image source as an intermediate image between the mirror and the first lens, wherein a distance between the intermediate image and the first lens is less than the fixed focal length of the first lens.

8. The device according to claim 6, further comprising:
a polarizer arranged between the image source and the second lens to polarize the light from the image source,
a polarizing beam splitter, PBS, configured to reflect the polarized light from the image source onto the mirror.

9. The device according to claim 8, further comprising:
a quarter waveplate arranged between the PBS and the mirror to allow light reflected from the mirror to pass through the PBS into the first lens.

10. The device according to claim 1, further comprising:
a light guide arranged to redirect the light sent into and transmitted through the first lens so as to overlap said sent and transmitted light with ambient light.

11. The device according to claim 5, wherein:
the imaging element is configured to move over the defined distance step by step with a step frequency that is equal to a refresh rate of the image source and with step lengths that correspond to a distance between two adjacent depth layers.

12. The device according to claim 5, wherein:
the imaging element is configured to move forward and backward over the defined distance continually with a frequency that is equal to a frame rate of the image source.

13. The device according to claim 1, further comprising:
an eye piece for displaying the generated 3D light field, wherein a distance between the first lens and the eyepiece is equal to the fixed focal length of the first lens.

14. The device according to claim 1, wherein the device is a head mount display, HMD, device.

15. A method for generating a 3-dimensional, 3D, light field, comprising:
sending light from an imaging element into a first lens having a fixed focal length, and
wherein the imaging element moves to different positions within a defined distance on an optical axis of the first lens, and sends the light from the different positions in order to produce different depth layers of the 3D light field within a frame duration.

16. The method according to claim 15, comprising:
moving the imaging element forward and backward over the defined distance along the optical axis of the first lens, in order to send the light from the different positions.

17. The method according to claim 16, comprising:
reflecting light from an image source into the first lens by a mirror, wherein an image from the image source is reformed as an intermediate image between the mirror and the first lens, and
moving the mirror forward and backward over the defined distance along the optical axis of the first lens, in order to move the intermediate image.

18. The device according to claim 5, wherein the image source includes a display device.

* * * * *